April 3, 1945.  T. McL. JASPER  2,372,723
METHOD OF IMPROVING THE STRESS DISTRIBUTION
IN MULTILAYER HIGH PRESSURE CYLINDERS
Filed Nov. 7, 1941

Thomas McLean Jasper
INVENTOR.

BY *Elvin A. Andrus*
ATTORNEY.

Patented Apr. 3, 1945

2,372,723

UNITED STATES PATENT OFFICE 2,372,723

METHOD OF IMPROVING THE STRESS DISTRIBUTION IN MULTILAYER HIGH PRESSURE CYLINDERS

Thomas McLean Jasper, Milwaukee, Wis., assignor to A. O. Smith Corporation, Milwaukee, Wis., a corporation of New York Application November 7, 1941, Serial No. 418,206

9 Claims. (Cl. 29—148.2)

This invention relates to methods of improving the stress distribution in multi-layer high pressure cylinders and has particular relation to cylinders having a diameter-thickness ratio of ten or less.

The invention has been applied in the manufacture of large high pressure vessels under the Stresau Patent No. 1,925,118 and employing in some instances as many as thirty layers of metal each one-quarter of an inch in thickness. The layers are preferably applied and welded successively, each layer being tightened upon the previous one to eliminate voids therebetween.

Vessels constructed in the manner described by Stresau have under working load conditions a stress distribution between the layers much the same as that in solid wall vessels of similar diameter-thickness ratios. For design purposes such stress is generally computed by the Lamé formula:

$$S = \frac{PR_1^2(R_2^2 + R^2)}{R^2(R_2^2 - R_1^2)}$$

in which:

S denotes the circumferential tensile stress in pounds per square inch at any given point in the section;
P denotes the internal fluid pressure in pounds per square inch on the inside of the cylinder;
R denotes the radius in inches at the point of stress;
$R_1$ denotes the inside radius of the section in inches; and
$R_2$ denotes the outside radius of the section in inches.

In accordance with the Lamé formula it is known that the stress in the innermost layer may be as much as twice that in the outermost layer, making it necessary to add thickness to the vessel in order to keep the stress in the inner layer within the desired working stress range under the given load and factor of safety.

Attempts have been made to offset this difference in stress between the inner and outer layers under working load by developing in the vessel a pre-stressed condition in which the inner layers have an initial residual compressive stress and the outer layers have an initial residual tensile stress.

The object of the present invention is to provide a novel and simple method for pre-stressing the layers to obtain the desired equalization of stress between the layers under load.

Another object is to provide for evening out the concentration of the initial stressing of the layers to provide a more efficient structure.

According to the present invention an inner cylinder of substantial wall thickness and substantially free from residual stresses is first provided to constitute the inner structure of the wall, and then in the applying and welding of subsequent relatively thin layers onto the structure the latter is successively compressed to a smaller circumference to provide a wall having an inner section containing initial compressive stresses and an outer section containing initial tensile stresses.

In its more specific nature, according to one method of constructing the inner structure of the cylinder, the structure is fabricated of a plurality of layers applied and welded under compressive forces similar to the outer layers and then stress-relieved as by heating prior to the application of subsequent layers.

According to another method of constructing the inner structure of the cylinder, the structure is fabricated by the rolling of a single plate of the required thickness into cylindrical shape and welding the longitudinal seam therein, such structure being preferably subsequently stress-relieved by heating.

The invention is illustrated in the accompanying drawing in which.

Figure 1:
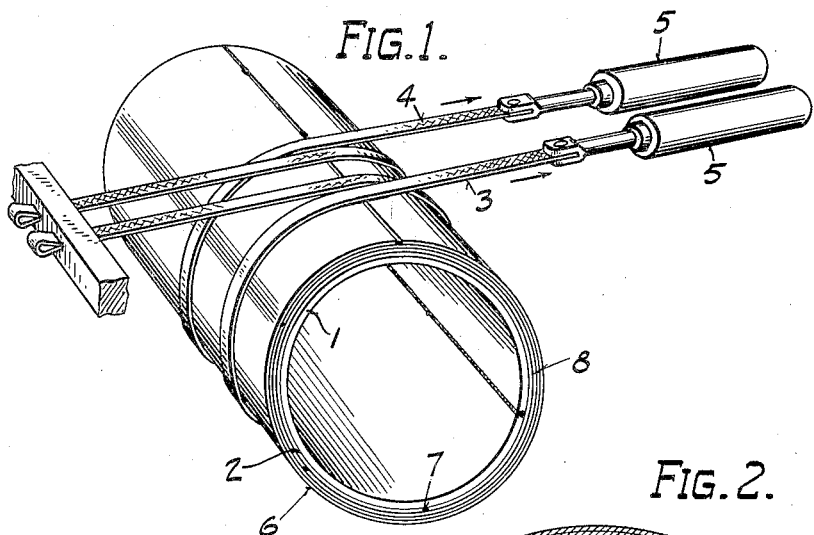
Figure 1 is a diagrammatic perspective view showing the application of a layer to the partially fabricated cylinder.
Figure 2:
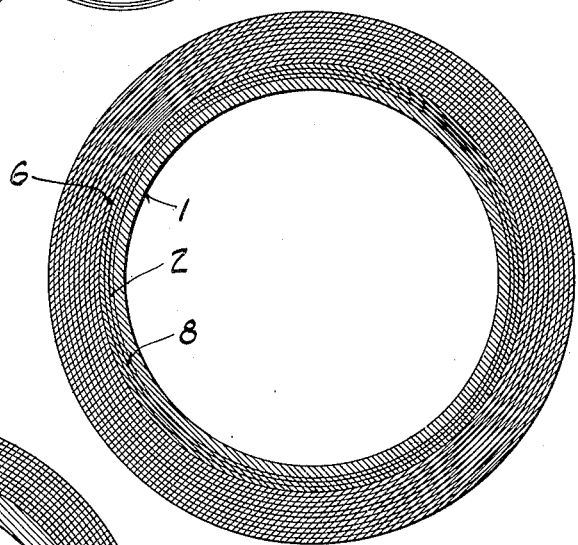
Fig. 2 is a transverse section through a cylindrical wall fabricated by the method of the invention.
Figure 3:
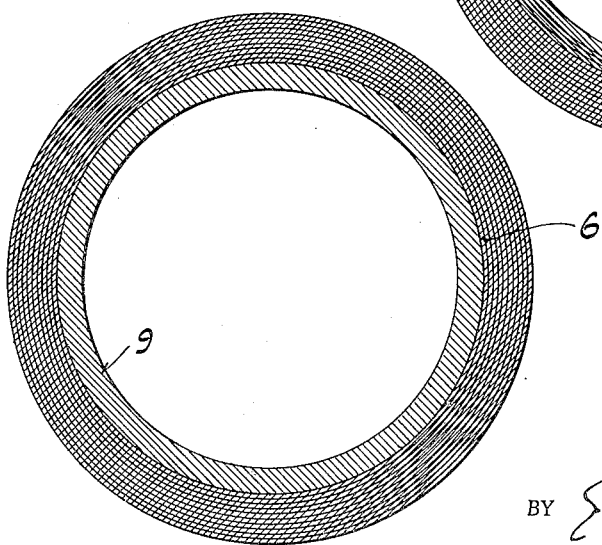
Figure 3 is a transverse section through a modified form of cylindrical wall also fabricated by the method of the invention.

In manufacturing the vessel in the preferred method, an inner cylindrical member 1 which will usually constitute the innermost layer of the wall is first fabricated by rolling or pressing a sheet of metal to cylindrical shape and then welding the longitudinal seam therein to close the cylinder. The next layer 2 is then tightly wrapped upon the member 1 and the structure squeezed by powerful tensioned bands 3 and 4 operated by the hydraulic cylinders 5, much as illustrated in Fig. 1 for the application of layer 6 to the structure.

This squeezing force of the bands 3 and 4 is sufficient to actually compress or squeeze the inner member 1 to a slightly smaller diameter, and the longitudinal seam 7 of the layer 2 is then welded while the bands are thus tensioned on the structure. Upon release of the tensioning bands after welding, the elastic return of the metal of the inner member 1 effects an expansion of the latter into the layer 2 so that all voids are reduced to a minimum and the inner member 1 remains under an initial residual compressive stress and the layer 2 contains initial residual tensile stresses.

Each subsequent layer is applied in the same manner, it being understood that it is possible within the scope of the invention to apply more than one layer at a time and also to apply intermediate layers without fully tensioning the same. As subsequent layers are thus applied layers adjacent the inner member 1, as layer 2, for instance, have their residual stresses changed from tensile stress to compressive stress so that in the finished structure the inner layers are under initial compressive stress and the outer layers are under initial tensile stress, the total of each form of stress being substantially balanced with the other. The welds for each layer are ground flush with the outer surface of the layer prior to the application of the next subsequent layer.

In the application of this process of pre-stressing it is best to employ an excess compressing of the structure in order to be sure of adequate compensation for the unequal stressing of the layers under the working load. However, it has been found in structures having a reasonably large number of layers that the compressive stress developed by the process has a tendency to accumulate and become excessive in the innermost layer and the next two or three layers, throwing the neutral axis of the wall toward the inner surface and resulting in the relieving of the inner layers of operating stress. Under such conditions the innermost layers may be said to be excessively negatively stressed and the outer layers have unnecessary additional tensile stress which reduces the over-all efficiency of the vessel.

In carrying out the present invention a reduction of the peak concentration of compressive stresses in the innermost layers is obtained.

In accordance with one method of carrying out the present invention the concentration of compressive stress in the innermost layers is removed by an intermediate stress relieving step in which the partially finished structure is heated to a stress relieving temperature after about the third or fourth layer is applied and before the application of subsequent layers.

When the structure is of ordinary steel the intermediate stress relieving step previously described may be carried out by slowly heating the structure comprising the innermost layer and about three added layers in a suitable furnace to a temperature of about 1150° F. and allowing it to remain at this temperature for a period of one hour for each inch of total thickness and then slowly cooling the structure, preferably at a rate of about 85° per hour.

The inner structure 8 thus provided of about one to one and a half inches in thickness will be substantially free from voids between the layers and from residual stresses.

As an alternative method of providing such an inner structure, a plate of a thickness of from one to one and a half inches may first be heated and rolled to cylindrical shape and the longitudinal seam welded. This single plate inner structure 9 may be stress relieved if it is desired to remove the forming and welding stresses.

After the inner structure, either 8 or 9, is thus provided the layer 6 and subsequent layers are successively wrapped and welded under squeezing pressure to pre-stress the structure as previously described. The compression stresses developed by this process will be transmitted to the inner structure above referred to, but will not be as highly concentrated therein as would be the case without the stress relieving step or the inner structure of substantial thickness.

After the cylinder is completed suitable heads will be welded to the ends of the layers to complete the pressure vessel.

The invention may be carried out in various ways within the scope of the accompanying claims.

I claim:

1. The method of improving the stress distribution in a multi-layer high pressure cylinder, comprising forming an inner cylindrical section of a plurality of layers of substantial thickness and substantially free from residual stresses, and applying to said structure a plurality of layers of metal by successively wrapping, tightening and welding each layer upon said inner cylindrical section under tension forces substantially compressing the inner structure during welding to provide a pre-stressed condition for the cylinder in which the neutral axis is outside of said inner section, each of said latter layers being selected thinner than said inner section.

2. The method of improving the stress distribution in a multi-layer high pressure cylinder, comprising fabricating the cylinder by successively applying and welding sheet metal layers on the outside of an inner cylindrical member with each layer tightened over the previous layer and applying a substantial compressive force thereupon setting up a residual stress differential between the layers varying from a compressive stress in the inner layer to a tension stress in the outer layers, and removing a portion of the compressive stress accumulation in the innermost layers as by heating the same to even out the pre-stressing of the cylinder approaching a compensation for the different rates of stress increase between the inner and outer layers of the vessel under working loads.

3. The method of improving the stress distribution in a multi-layer high pressure cylinder, comprising fabricating the cylinder by successively applying and welding sheet metal layers on the outside of an inner cylindrical member with each layer tensioned over the previous layer to apply a substantial compressive force thereupon setting up a residual stress differential between the layers varying from a compressive stress in the inner layer to a tension stress in the outer layers, and at an intermediate stage in the fabrication of the cylinder removing a portion of the compressive stress from the innermost layer as by heating the same to prevent excessive concentration of compressive stress therein.

4. The method of improving the stress distribution in a multi-layer high pressure cylinder, comprising fabricating the cylinder by successively applying and welding sheet metal layers on the outside of an inner cylindrical member with each layer tensioned upon the previous layer to apply a substantial compressive force thereupon setting up a residual stress differential between the layers varying from a compressive stress in the inner layer to a tension stress in the outer layers, and at an intermediate stage in the fabrication of the cylinder heating the inner section of the vessel to provide a stress-relieved inner structure upon which subsequent layers are tensioned.

5. The method of improving the stress distribution in a multi-layer high pressure cylinder, comprising fabricating the cylinder by successively applying and welding sheet metal layers on the outside of an inner cylindrical member with each layer tensioned upon the previous layer to apply a substantial compressive force thereupon setting up a residual stress differential between the layers varying from a compressive stress in the inner layer to a tension stress in the outer layers, and relieving a substantial part of the stress concentration in the innermost layer by heating the same.

6. The method of improving the stress distribution in a multi-layer high pressure cylinder having a diameter thickness ratio not in excess of about ten and constructed of a large number of sheet metal layers, comprising forming an inner cylindrical section several times the thickness of the average layer and substantially free from residual stresses, and successively wrapping and welding a plurality of the remaining layers of the structure upon said inner section under a squeezing pressure which elastically contracts said inner section at the time each layer is welded to provide an elastic return of the inner section into said layers thereby producing in said inner section an initial compressive stress and a corresponding initial tensile stress in the outer layers of the structure to provide a neutral axis for said initial residual stresses radially outside of said inner section.

7. The method of more uniformly distributing the residual stress differential between the adjacent layers of a pre-stressed multi-layer cylinder having a diameter to thickness ratio not in excess of about ten, comprising fabricating the cylinder by first constructing a substantially stress free inner structure of substantial thickness, and thereafter fabricating the outer structure thereon, layer by layer, by selecting each successive layer thinner than said inner structure and tensioning the same to provide the residual pre-stress for the cylinder.

8. The method of more uniformly distributing the residual stress differential between the several layers of a pre-stressed multi-layer cylinder, comprising fabricating the cylinder and tensioning each successive layer thereof as it is applied to provide a prestressed multilayer cylinder having its neutral axis between the center of its wall and the inner surface thereof, and heating only the innermost structure of the cylinder to relieve the peak stresses therein and effect a transfer of the neutral stress point radially outward in the wall of the cylinder.

9. The method of more uniformly distributing the residual stress differential between the adjacent layers of a pre-stressed multilayer cylinder, comprising fabricating the cylinder by first constructing a substantially stress free inner cylinder of heavy plate structure of substantial thickness, and thereafter fabricating the outer structure thereon of relatively thin layers by successively applying and tensioning the same thereon to provide the residual pre-stress of the cylinder.

THOMAS McLEAN JASPER.